July 31, 1956     J. P. MILLER ET AL     2,756,690

RAILWAY TRUCK

Filed Dec. 30, 1950

Inventors
J. Paul Miller &
Loren D. Britton
By Willits, Helwig & Baillio
Attorneys

United States Patent Office 2,756,690
Patented July 31, 1956

2,756,690

RAILWAY TRUCK

Joseph Paul Miller, Hinsdale, and Loren D. Britton, La Grange, Ill., assignors to General Motors Corporation, Detroit, Mich., a corporation of Delaware Application December 30, 1950, Serial No. 203,732

9 Claims. (Cl. 105—182)

This invention generally relates to railway vehicles and more particularly to traction trucks for locomotive vehicles.

The principal object of the invention is to provide a simple traction truck including a truck frame resiliently supported adjacent one end on a driving axle having wheels secured thereon and a driving mechanism supported on the driving axle articulated by means of a torque reaction link to the truck frame which is also supported and guided adjacent the other end by means of longitudinal arms articulated with the truck frame and supported on a guiding axle having guiding wheels thereon, the truck frame being provided with a center plate located between the guiding axle and driving axle and closer to the latter axle to provide stable riding and curving characteristics, together with maximum adhesion and traction of the driving wheels both on tangent and curved track.

The combined means by which this object is accomplished together with other novel features of the invention will become apparent by reference to the following detailed description and drawings illustrating the details of the invention.

Figure 1:
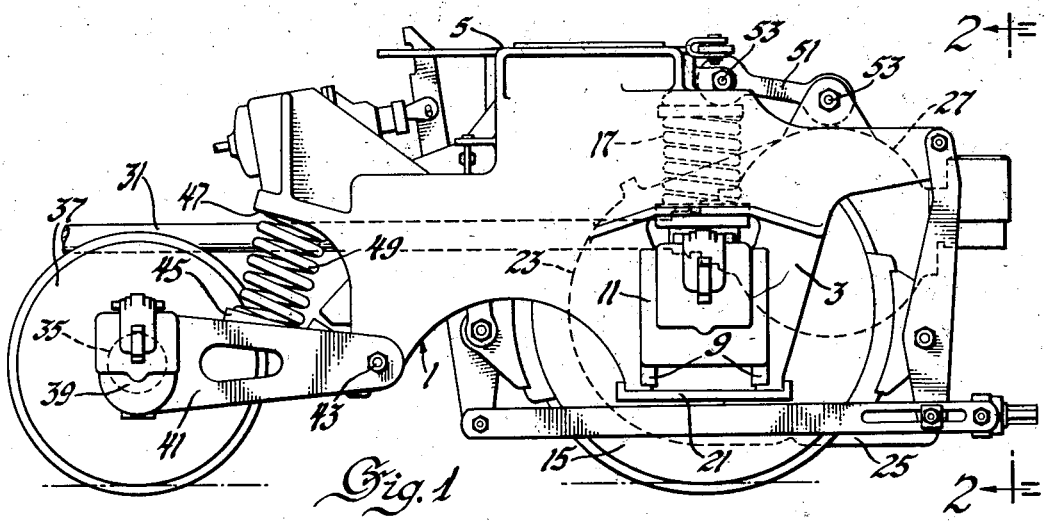
Figure 2:
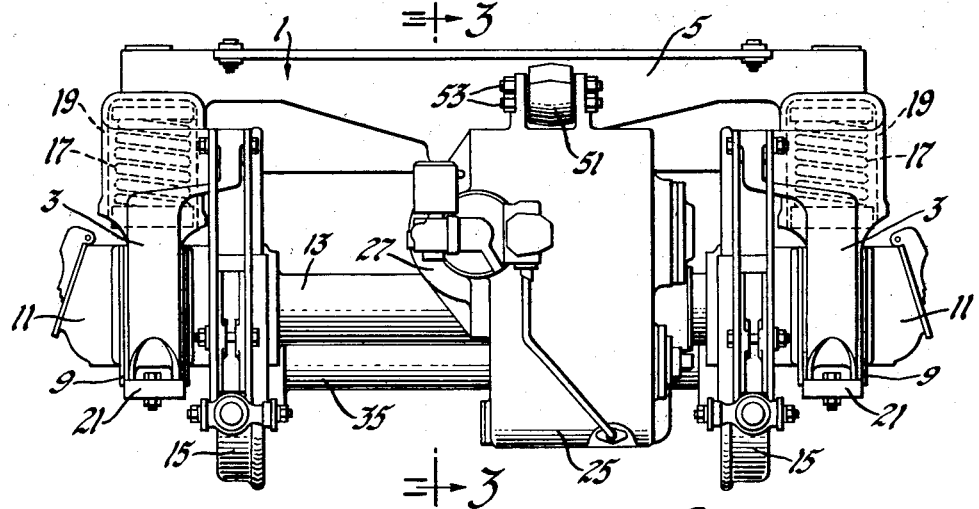
Figure 3:
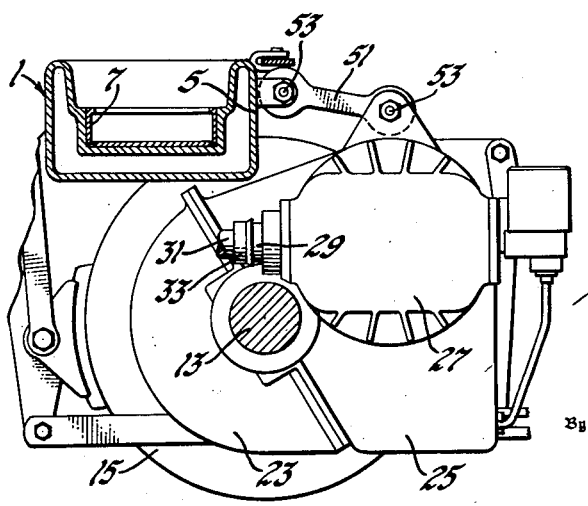

Figure 1 of the drawings is a side elevation view of the truck assembly;

Figure 2 of the drawings is a vertical and elevation view of the truck assembly taken substantially on line 2—2 of Figure 1; and, Figure 3 is a sectional view taken substantially on line 3—3 of Figure 2 with parts shown in sections and broken away.

As best illustrated in Figures 1 and 2 the truck assembly comprises a truck frame, generally indicated by the reference character 1, having side frame portions 3 and an upper transverse bolster portion 5 having a depressed cylindrical center plate portion 7, best illustrated in Figure 3, in which the center plate of one end of the under frame of the locomotive body, not shown, is articulated. Each of the truck frame side portions 3 is provided with longitudinally spaced vertical pedestal guides 9 adjacent one end and offset longitudinally outwardly with respect to the center plate portion 7. Journal boxes 11 are slidable between the vertical pedestal guides 9 and are supported on the outer end journal portions of a driving axle 13 having driving wheels 15 secured thereon. Helical springs 17 are located in spring pockets 19 in the truck frame 1 located above and between the pedestal guides 9. The lower ends of the springs 17 engage the driving axle journal boxes 11 which, as best seen in Figure 1, are offset longitudinally outwardly with respect to the transverse frame or bolster portion 5 and center plate portion 7 therein. Retainer bars 21 are secured between the lower ends of the pedestal guides 9 to limit downward movement of the journal boxes 11 relative to the truck frame.

The driving gear mechanism, generally indicated by the reference character 23 in Figure 3, is carried by the driving axle 13 intermediate the driving wheels 15. This gear mechanism includes a reduction gear housing 25 supported directly on the driving axle 13 and a reversing gear housing 27 removably secured to the reduction gear housing 25 and having a drive shaft 29 shown projecting outwardly of the housing 27 and longitudinally inwardly of the truck frame over the driving axle 13. A propeller shaft 31 is operably connected by means of a universal joint 33 to the driving shaft 29 and is also shown extending longitudinally therefrom over a guiding truck axle to which smaller diameter guiding wheels 37 are secured. The guiding axle 35 is provided with outer end journal portions on each of which an outer end journal box portion 39 of a longitudinal arm 41 is supported. The inner end of each longitudinal arm 41 is pivoted by a transverse pin 43, preferably mounted on rubber bushings in the other end of each truck frame side portion 3. A longitudinally inwardly and upwardly inclined spring seat 45 is provided on each longitudinal arm 41 and a longitudinally outwardly and downwardly extending spring seat 47 is provided on each side frame portion 3 facing each arm spring seat. A helical spring 49 is placed between these facing spring seats 45 and 47, the spring 49 being thus inclined longitudinally outwardly and downwardly with relation to the truck frame 1 at the opposite end thereof from the driving axle 13.

As best seen in Figure 3, a torque reaction link 51 is pivoted at the outer end to the upper portion of the gear housing 27 and this link is shown inclined longitudinally inwardly and upwardly over the driving axle and is pivoted at its inner end to the transverse frame or bolster portion 5. Transverse pins 53 which are preferably mounted in resilient bushings supported in openings in the gear housing and transverse frame portion serve to pivotally connect the opposite ends of the torque reaction link and to cushion the driving torque reaction on the gear housing and to maintain the driving shaft substantially horizontal. The inclination of the torque reaction link permits slight rotary movement of the gear housings relative to the driving axle when this axle moves vertically and tilts transversely with respect to the truck frame 1 due to unevenness of the track to maintain the drive shaft substantially horizontal.

The truck frame center plate portion 7 being located only a slight distance inwardly of the driving axle 13 and a much greater distance inwardly from the guiding axle 35 causes the majority of the weight of one end of the locomotive to be imposed on the driving wheels 15 thereby permitting large values of driving torque to be applied thereto without slippage of these driving wheels on the rail. The smaller guiding axles 35 and wheels 37 being located farther from the center plate portion 7 and the longitudinal supporting and guiding arms 41 supported on the guiding axle and articulated at the inner ends to the truck side frame portions carries sufficient locomotive weight necessary to provide adequate curving action of the truck frame assembly and smooth stable riding of the locomotive on both tangent and curved track. Also unobstructed angular movement of propeller shaft 31 over both driving and guiding axles 13 and 35 is provided by the use of smaller diameter guiding wheels 37 than the driving wheels 15.

We claim:

1. In a railway truck, longitudinally spaced axles having journals, wheels on the axles, a truck frame having an upper center plate between the axles and vertical pedestal guides in the sides, journal boxes slidable in the pedestal guides and supported on the journals of one axle, guiding and load supporting arms pivoted about a transverse axis of the truck frame and extending longitudinally outwardly therefrom and having outer end journal box portions supported on the journals of another axle, springs between the truck frame and the journal boxes, and springs between the truck frame and the guiding and supporting arms.

2. In a railway truck, longitudinally spaced axles having journals, wheels on the axles, a truck frame having a center plate between the axles and pedestal guides in the sides adjacent one of said axles, journal boxes supported on the journals of said one axle and slidable in the pedestal guides, guiding and supporting arms pivoted at the inner ends about a transverse axis in the truck frame, said arms having journal box portions at the other ends supported on the journals of another axle, said axis being located between the center plate and said other axle, springs between the truck and the journal boxes and springs between the truck frame and the guiding and supporting arms spaced from said axis.

3. In a railway truck, longitudinally spaced axles having journals, large diameter wheels on one axle and small diameter wheels on another axle, a truck frame having an upper center plate between the axles and vertical pedestal guides in the sides adjacent said one axle, journal boxes slidable in the pedestal guides and supported on the journals of the axle having the large diameter wheels thereon, longitudinal guiding and supporting arms pivoted at the inner ends about a transverse axis of the truck frame intermediate said other axle and the center plate, each said guiding and supporting arms having journal boxes in the outer end supported on the journals of the axle having the small diameter wheels thereon, springs between the truck frame and journal boxes supported on the axle having the large diameter wheels and springs between the truck frame and guiding and supporting arms spaced from said axis.

4. In a railway traction truck, driving and guiding axles having outer end journals, wheels on the axles, a truck frame having longitudinally extending side frame portions provided with vertical pedestal guides adjacent one end and a transverse bolster portion intermediate the ends and adjacent the driving axle, journal boxes slidable in the pedestal guides and supported on the journals of the driving axles, springs between the journal boxes and truck frame, longitudinal arms pivoted at their inner ends to the ends of the frame side portions opposite said pedestal guides about a transverse axis and having journal boxes in their outer ends supported on the journals of the guiding axle, springs between the arms and truck frame spaced from said axis, a driving gear housing on the driving axle, and a longitudinal torque reaction link pivotally connecting the driving gear housing with the truck frame.

5. In a railway traction truck, driving and guiding axles having journals, driving wheels on the driving axles, guiding wheels on the guiding axle of smaller diameter than the driving axles, a driving gear housing on the driving axle, a truck frame having side frame portions provided with vertical pedestal guides adjacent one end and a transverse bolster portion having a center plate offset longitudinally toward the guiding axle from the pedestal guides, transverse pivot pins on the other end of the side frame portions, longitudinal guiding arms pivoted at their inner ends on the pivot pins and having outer end journal boxes supported on the journals of the guiding axle, springs between the guiding arms and truck frame spaced from said pins, journal boxes slidable in the pedestal guides and supported on the journals of the driving axle, springs between the truck frame and the driving axle journal boxes and a torque reaction link pivoted at one end to the bolster portion over the driving axle, and pivoted at the other end to the driving gear housing at a point outwardly of the driving axle.

6. In a railway traction truck, a truck frame having side portions provided with vertical pedestal guides adjacent one end and a transverse bolster portion provided with a depressed center plate portion of cylindrical form intermediate the ends of the frame side portions, guiding arms pivoted at their inner ends to the other end of the truck frame side portions about a transverse axis and extending longitudinally outwardly therefrom and having journal boxes on their outer ends, a driving axle having outer end journals, driving wheels on the driving axle, a housing carried by the driving axle including axle driving gears and a longitudinal drive shaft offset with reference to the driving axle center line, journal boxes supported on the driving axle journals and vertically slidable in the pedestal guides, springs between the journal boxes and the truck frame, a guiding axle having outer end journals supporting the journal boxes of the guiding arms, guiding wheels on the guiding axle of smaller diameter than the driving wheels, springs between the guiding arms and truck frame spaced from said axis, and a longitudinal torque reaction link pivotally connecting the frame bolster portion with the driving gear housing to maintain the drive shaft horizontal.

7. In a railway traction truck, a truck frame, longitudinally spaced driving and guiding axles having journals, wheels on the axles, a truck frame having side portions provided with vertical pedestal guides adjacent one end and a transverse bolster portion having a center plate intermediate the axles, longitudinal arms pivoted at their inner ends to the other end of the truck frame side portions about a transverse axis and having journal box portions on their outer ends supported on the journals of the guiding axle, springs between the truck frame and longitudinal arms spaced from said axis, journal boxes slidable in the pedestal guides and supported on the journals of the driving axle, springs between the truck frame and journal boxes in the driving axle, a gear housing carried on the driving axle and including axle driving gears and having a longitudinal driving shaft offset with respect to the center line of the driving axle, and a torque reaction link pivotally connecting the gear housing with the bolster and normally maintaining the driving shaft horizontally disposed with respect to the truck frame.

8. In a railway traction truck, a driving axle, a guiding axle, said axle having outer end journals, large diameter wheels on the driving axle, small diameter wheels on the guiding axle, a truck frame having side portions provided with vertical pedestal guides adjacent one end and spring pockets located between and above the pedestal guides and a transverse bolster portion having a depressed center plate portion of cylindrical form intermediate the axles, longitudinal guiding arms pivoted at their inner ends about a transverse axis on the other end of the truck frame side portions and having journal box portions on their outer ends, helical springs in the spring pockets, journal boxes on the journals of the driving axle and slidable between the pedestal guides and in engagement with the helical springs, the journal box portions of the guiding arms being supported on the journals of the guiding axle, helical springs inclined downwardly and longitudinally outwardly from the frame side portions and engageable with the guiding arms and normally positioning the arms substantially horizontal, a driving gear housing having a longitudinal drive shaft offset with respect to the center line of the driving axle, a universal joint on the drive shaft, a longitudinal torque reaction link pivotally connected to the frame bolster portion and to the driving gear housing and extending longitudinally outwardly and downwardly over the driving axle between the bolster portion and gear housing for normally positioning the drive shaft substantially horizontal above the driving axle and positioning the universal joint thereon above the driving axle, and a propeller shaft extending over the guiding axle and connected to the universal joint for driving the driving axle.

9. In a railway traction truck, a driving axle, a guiding axle, said axles having outer end journals, large diameter wheels on the driving axle, small diameter wheels on the guiding axle, a truck frame having side portions provided with vertical pedestal guides and spring pockets above the guides and a transverse bolster frame portion, longitudinal guiding arms pivoted at their inner ends to the truck frame side portions about a transverse axis spaced longitudinally from the pedestal guides, said arms having journal box portions on their outer ends supported on the journals of the guiding axle, journal boxes on the journals of the driving axle and slidable in the pedestal guides, helical springs in the spring pockets engaging the driving axle journal boxes, spring seats in the frame side portions projecting over the guiding arms, helical springs between the spring seats and arms spaced from said axis, said bolster portion of the truck frame having a center plate located intermediate the spring pockets and the spring seats, said center plate being relatively adjacent the spring pockets and relatively remote from the spring seats.

References Cited in the file of this patent

UNITED STATES PATENTS

| | | |
|---|---|---|
| 496,145 | Williams | Apr. 25, 1893 |
| 1,377,703 | Lamont | May 10, 1921 |
| 1,642,890 | Pflager | Sept. 20, 1927 |
| 1,743,514 | Alley et al. | Jan. 14, 1930 |
| 2,023,756 | Brownyer | Dec. 10, 1935 |
| 2,286,608 | Eksergian | June 16, 1942 |

FOREIGN PATENTS

| | | |
|---|---|---|
| 28,300 | Switzerland | Mar. 23, 1903 |
| 252,280 | Germany | July 18, 1911 |
| 361,080 | France | Jan. 21, 1907 |